US006138339A

United States Patent [19]

Escher et al.

[11] Patent Number: 6,138,339

[45] Date of Patent: Oct. 31, 2000

[54] METHOD OF ASSEMBLING A GUIDE BAR

[75] Inventors: Heinz Escher, Weinstadt; Bernd Andress, Erdmannshausen; Martin Baum, Ludwigsburg; David Mitrega, Winnenden, all of Germany

[73] Assignee: Andreas Stihl AG & Co., Waiblingen, Germany

[21] Appl. No.: 09/285,273

[22] Filed: Apr. 2, 1999

[30] Foreign Application Priority Data

Apr. 6, 1998 [DE] Germany ........................... 198 15 289

[51] Int. Cl.[7] ..................................................... B23D 57/02

[52] U.S. Cl. ................................. 29/418; 76/112; 30/387

[58] Field of Search ............................ 30/387, 383, 381; 76/112; 29/418

[56] References Cited

U.S. PATENT DOCUMENTS

| | | | |
|---|---|---|---|
| 3,119,418 | 1/1964 | Rayniak | 76/112 X |
| 4,693,007 | 9/1987 | Apfel et al. | 30/387 |
| 4,903,410 | 2/1990 | Wieninger et al. | 30/387 |
| 5,067,243 | 11/1991 | O'Neel | 30/387 |
| 5,249,363 | 10/1993 | Mitrega et al. | 30/387 |
| 5,271,157 | 12/1993 | Wieninger et al. | 30/387 |

*Primary Examiner*—Douglas D. Watts
*Attorney, Agent, or Firm*—Walter Ottesen

[57] ABSTRACT

The invention relates to a method for assembling a guide bar having a guide groove for a saw chain of a motor-driven chain saw. The guide groove extends along the periphery of the guide bar. The guide bar includes two parallel mutually adjacent side parts and individual spacers arranged between the side parts. The spacers hold the side parts at a spacing corresponding to the groove width. The side parts as well as the spacers are inseparably joined to each other at individual attachment points. A spacer is arranged at each attachment point. The spacers are fixed to a common carrier to obtain a light guide bar accurate with respect to size. The carrier is removed after the side parts are joined.

6 Claims, 4 Drawing Sheets

1
2
3
4
5
6
8
9
10
11a
11b
13
17
18
19
20
21
26
27
29

METHOD OF ASSEMBLING A GUIDE BAR

FIELD OF THE INVENTION

The invention relates to a method for assembling a guide bar having a guide groove for a saw chain of a motor-driven chain saw. The guide groove extends over the periphery of the guide bar. The invention also relates to a carrier for spacers for use in carrying out the method of the invention.

BACKGROUND OF THE INVENTION

An assembled guide bar is disclosed in U.S. Pat. No. 4,693,007. A frame-like intermediate plate is provided in order to guarantee a spacing of the side parts relative to each other corresponding to the groove width. The frame-like intermediate plate lies between the side parts and has steel inserts at the attachment points for achieving a good weld. The structure of a guide bar of this kind with inserted steel platelets is very complex and nevertheless does not provide a satisfactory reduction of weight.

A light, durable guide bar is disclosed in U.S. Pat. No. 5,249,363. The frame-like side parts have bent-over or offset weld tongues which project inwardly. These weld tongues each lie against the other plate-shaped side part. The spacing of the two side parts to each other and therefore the width of the guide groove is determined by the offsets and they must be configured to be precise with respect to size. The free ends of the offset tongues are then permanently welded to each other; however, inaccuracies with respect to size can occur because of the temperature increases.

SUMMARY OF THE INVENTION

It is an object of the invention to provide a method for making a light guide bar which is very precise with respect to size and which can be manufactured with little complexity.

The method of the invention is for assembling a guide bar of a motor-driven chain saw, the guide bar having a periphery and a guide groove of a predetermined groove width along the periphery for accommodating the saw chain of the chain saw. The guide bar includes first and second side parts and a plurality of spacers arranged between the side parts for holding the side parts at a spacing from each other corresponding to the groove width. The method includes the steps of: providing a common carrier holding the spacers so as to place the spacers at preassigned individual attachment points between the side parts; joining the spacers and the side parts so that the spacers and the side parts are inseparably fixed to each other at the individual attachment points while the spacers are held by the common carrier; and, removing the common carrier after the spacers and the side parts are joined to each other.

Each spacer can be easily positioned in its location to the particular attachment point by positioning the carrier because these individual spacers are held by a common carrier. The carrier is removed after welding the side parts to the spacers which are made of a good weldable material so that only the spacers contribute to increasing the weight of the guide bar. A high accuracy of size of the guide groove is ensured in this way.

Preferably, the carrier is removed after the connection of the side parts via the central cutouts provided in the side parts. Preferably, the edge of the cutout in the side plates is defined by a punched edge.

The carrier can support the spacers lying on one side of the longitudinal center axis of the guide bar. All spacers of the guide bar are preferably joined to the carrier.

BRIEF DESCRIPTION OF THE DRAWINGS

The invention will now be described with reference to the drawings wherein.

DESCRIPTION OF THE PREFERRED EMBODIMENTS OF THE INVENTION

Figures 1, 2, 3:
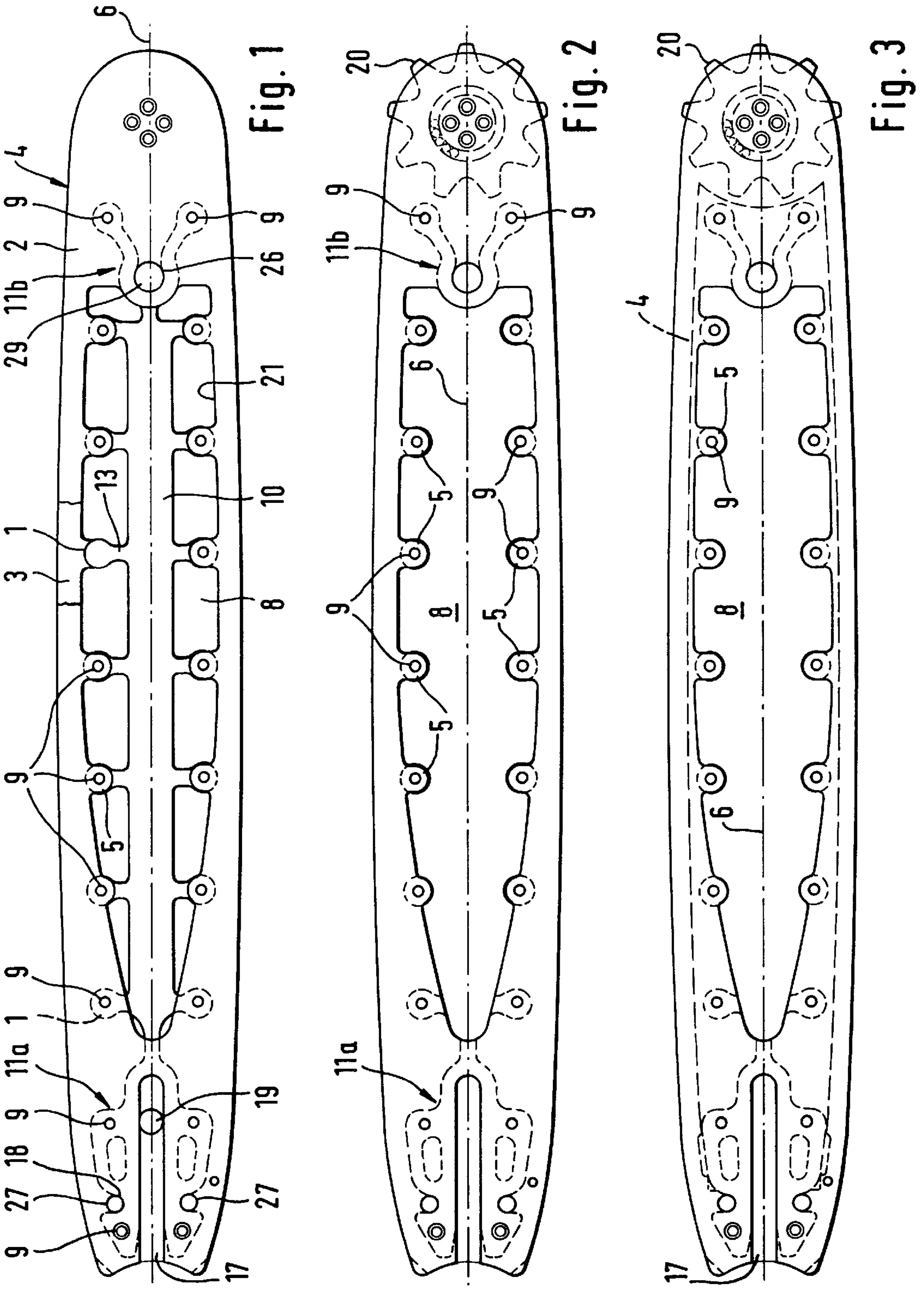
FIG. 1 is a side elevation view of a guide bar assembled from side parts, spacers and a carrier for the spacers.
FIG. 2 is a side elevation view of the guide bar of FIG. 1 with the carrier removed.
FIG. 3 is a side elevation view of the guide bar of FIG. 2 with the indicated cutout filled by casting.

The guide bar 7 shown in FIGS. 1 to 3 is a built-up guide bar which is assembled from side parts 2 and 3 which lie approximately parallel and in coincidence to each other. Spacers 1, 11*a* and 11*b* are arranged between the flat side parts 2 and 3 in order to form a guide groove 4 for the saw chain of a motor-driven chain saw. The guide groove 4 extends along the periphery and the spacers (11*a*, 11*b*) hold the spacing which corresponds to the groove width of the guide groove 4. The spacers 1 are configured as flat disc-shaped platelets which lie on the side parts. The spacers 1 lie between respective weld tongues 5 of the side parts 2 and 3. The weld tongues 5 are aligned in the plane of the side parts 2 and 3 transversely to the longitudinal center axis 6 of the guide bar 7. The weld tongues 5 project into a central cutout 8 which is formed in each of the side parts 2 and 3. The side parts (2, 3) therefore have a frame-like configuration in the center region viewed in the direction of the longitudinal axis.

The weld tongues 5 and other attachment points 9 form weld points at which the side parts 2 and 3 are inseparably connected via the spacers 1, 11*a* and 11*b* to each other to form a common unit. The attachment points 9 lie forward and rearward of the cutout 8 in the longitudinal direction of the guide bar 7.

Figure 4:
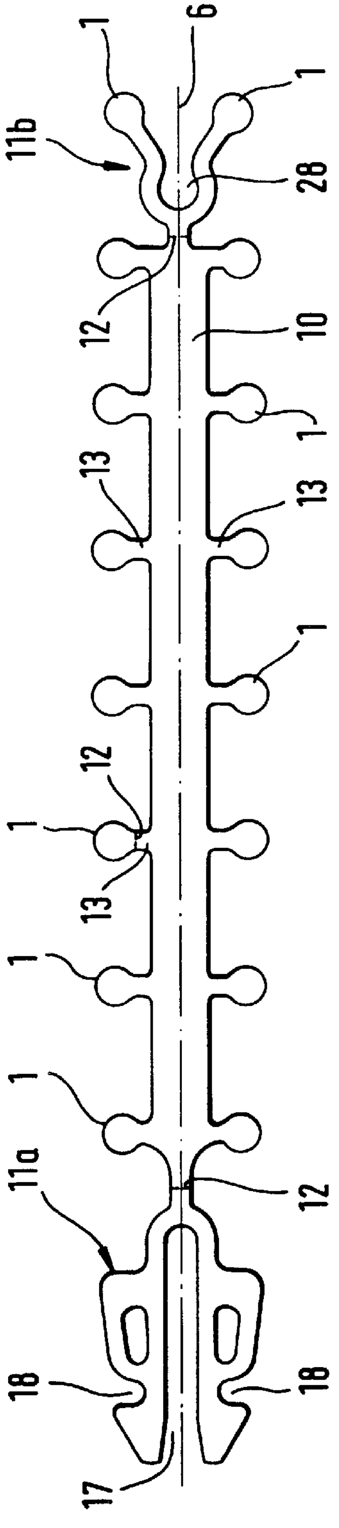
FIG. 4 is a side elevation view of a carrier having the spacers mounted thereon.

As shown in FIGS. 1 and 4, the individual spacers 1 are fixed on a common carrier 10. In the embodiment of FIG. 4, the spacers 1, 11*a* and 11*b* as well as the carrier 10 are made of the same weldable material which is preferably steel. The carrier 10 holds all spacers 1, 11*a* and 11*b* of the guide bar shown in FIG. 1. The spacers 1, 11*a*, 11*b* are connected via desired break locations 12 to the carrier 10. FIGS. 5 to 10 show how such a desired break locations 12 can be formed.

Figure 6:
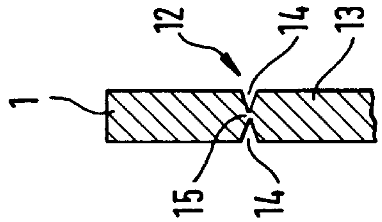
FIG. 6 is a section view taken along line VI—VI of FIG. 5.
Figure 5:
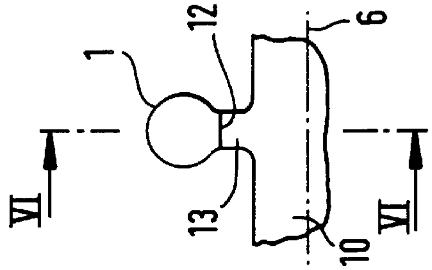
FIG. 5 is an enlarged view of a spacer.

In the embodiment shown, the carrier 10 is configured as a strut extending in the direction of the longitudinal center axis 6. From this strut, holding lugs 13 project transversely and have free ends which hold the preferably disc-shaped spacers 1. The carrier 10 with the spacers 1, 11*a* and 11*b* preferably lies in a plane which simultaneously defines the partition plane between the side parts (2, 3). The connection between the holding lug 13 and the spacers 1 defines the desired break location 12 which is defined by notches 14 on both sides as shown in FIG. 6. The two notches 14 lie opposite each other so that the spacer 1 is held only by a weak web 15 of material to the carrier 10.

Figure 7:
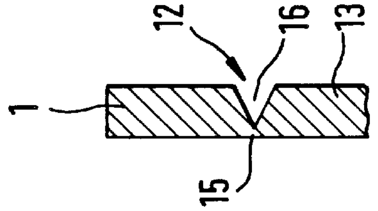
FIG. 7 is a section view corresponding to FIG. 6 but for another embodiment.

In FIG. 7, the disc-shaped spacer 1 is separated from the holder lug 13 by a large notch 16 up to a web 15 of thin material. The large notch 16 is introduced from one side.

Figure 8:
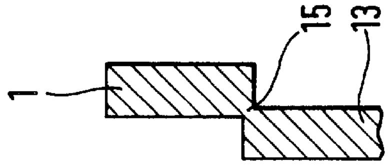
FIG. 8 is a section view corresponding to FIG. 6 for another embodiment.

As shown in FIG. 8, a pre-punching is also possible and a web 15 of thin material again remains. The web 15 ensures that the disc-shaped spacer 1 is held on the holder lug 13 while, on the other hand, an easy pressing of the carrier 10 out of the cutout of the side parts (2, 3) is possible.

Figure 10:
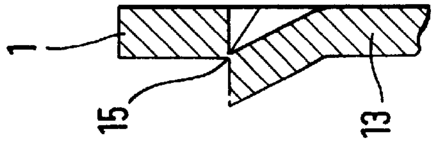
FIG. 10 is a section view taken along line X—X through the spacer of FIG. 9.
Figure 9:
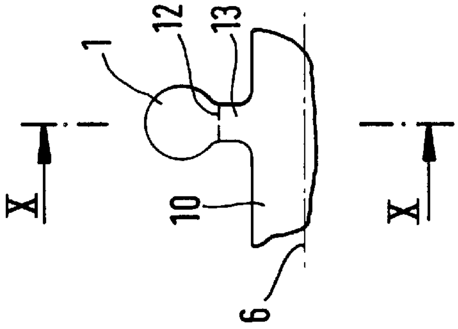
FIG. 9 is a view of a spacer of another embodiment of the invention.

FIGS. 9 and 10 likewise show a configuration with which the spacer 1 is almost cut off by pre-punching. However, a web 15 of thin material remains which makes possible an easy separation of the spacer 1 from the carrier 10 as will be described hereinafter.

The spacers 1 are attached to the holder lugs 13 lying transversely to the longitudinal center axis 6. Not only the distance holders 1 are connected via desired break locations 12 but also the spacers 11*a* and 11*b* arranged at the ends of the carrier 10. The spacer 11*a* surrounds the attachment slot 17 of the guide bar 7 in a U-shaped manner. The legs are configured so as to be widened. The alignment pin 19 (FIG. 1) of an assembly device engages in the U-shaped contour of the spacer. The widened legs of the U-shaped spacer 11*a* simultaneously define attachment points 9.

The spacer 11*b* is arranged at the opposite-lying end and is configured to be approximately V-shaped. The opening lies facing toward the end of the guide bar 7 which includes the idler sprocket 20. The base of the V-shaped spacer 11*b* is provided as an adjusting cutout 28 for an alignment pin 29 of the assembly device (FIG. 1). The free ends of the V-shaped spacer are expanded in correspondence to the disc-shaped spacers 1 and define attachment points 9 for the side parts (2, 3).

The spacers 11*a* and 11*b* lie in the longitudinal direction of the longitudinal center axis 6 and are symmetrical thereto. In the same way, the carrier 10 is symmetrically divided by the longitudinal center axis 6 of the guide bar 7.

The side parts 2 and 3 are threaded in the assembly device onto the alignment pins 19 and 29 so as to be correct in position and to be mutually coincident. The carrier 10 is inserted between the side parts 2 and 3 and projects with its spacers (1, 11*a*, 11*b*) between the side parts 2 and 3 thereby defining the spacing of the side parts to each other. The spacing of the side parts corresponds to the groove width of the guide groove 4. Now, the side parts are welded to each other at the attachment points 9, for example, by projection welding, spot welding or the like. After the side parts (2, 3) and the spacers (1, 11*a*, 11*b*) are inseparably joined to each other and form a common structural unit, namely, the guide bar 7, the carrier 10 is pressed out through the cutouts 8 in the side parts 2 and 3. This can take place with a simple stamp which develops the necessary force which leads to breakage of the desired break locations 12 provided between the spacers (1, 11*a*, 11*b*) and the carrier 10. However, this pressing out can also take place in that the edge 21 of the cutout 8 is used as a punch edge whereby the material between the spacers (1, 11*a*, 11*b*) and the carrier 10 is sheared off. This can be done also with a pre-punching in accordance with FIGS. 8 and 10. The assembled guide bar 7 without carrier 10 is shown in FIG. 2.

According to FIG. 3, the cutout 8 as well as the spacing between the side parts 2 and 3 except for the region of the guide groove 4 are filled with plastic or another castable light material. Oil feed openings 27 are in the side parts and a corresponding coincident opening 18 is held open in the spacer.

Figure 11:
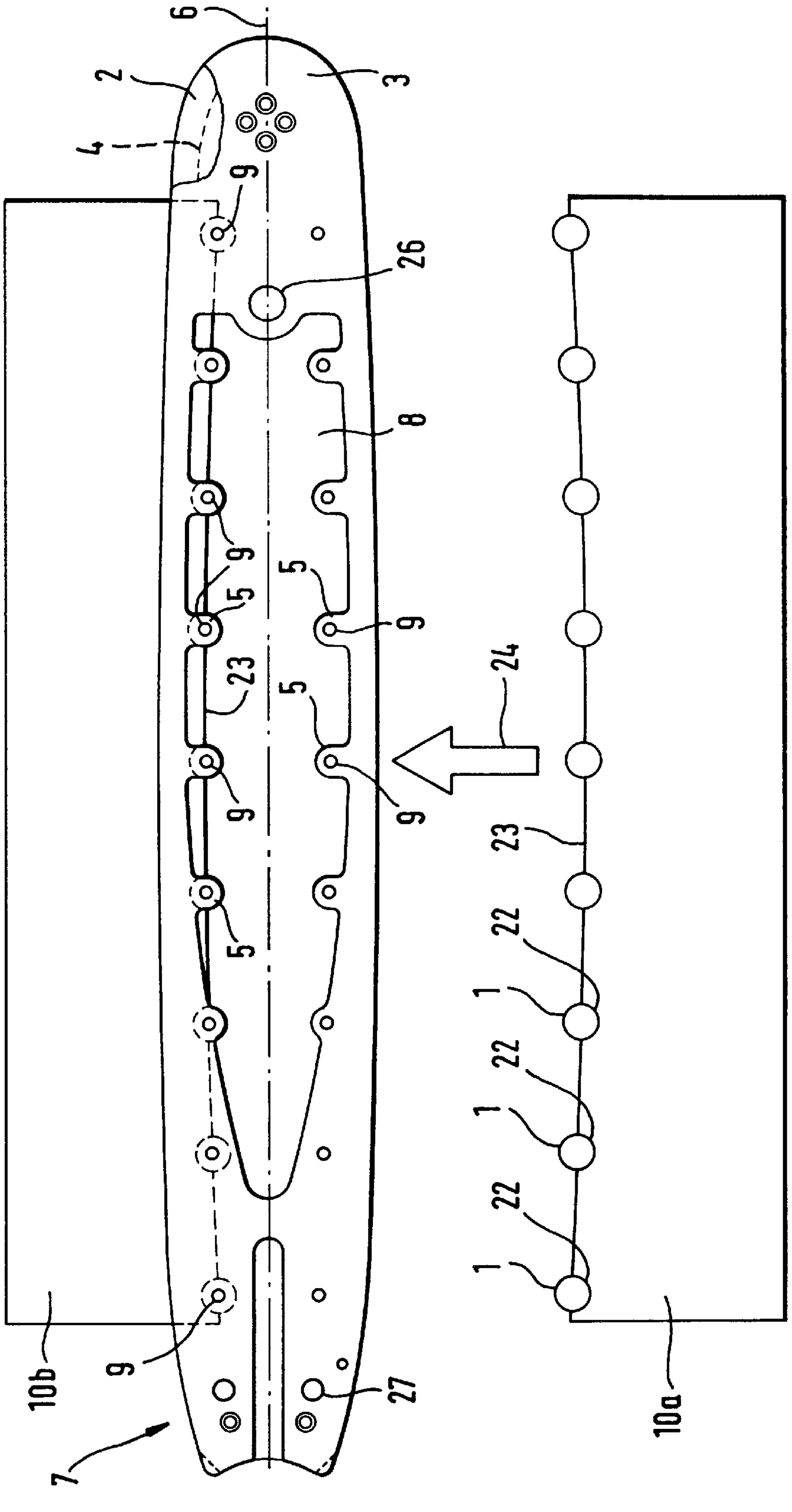
FIG. 11 is aside elevation view of the assembly of a guide bar having laterally supplied spacers.

In the embodiment of FIG. 11, two carriers 10*a* and 10*b* are provided which can be of another material than the spacers 1. The spacers 1 are seated in receptacles 22 in the edge 23 of the carrier (10*a*, 20*b*) and are positioned in common therewith through the guide groove 4 to the attachment points 9 by the guide groove 4. In this way, the plate-shaped spacers 1 can be glued into the half-circle-shaped cutout 22. When welding, the adhesive connection is destroyed and the spacer 1 is thereby released from the carrier. A magnetic holder can also be advantageous. After the side parts (2, 3) are welded via the spacers 1, the carriers (10*a*, 10*b*) are pulled out from the groove of the guide bar 7 in a direction opposite to arrow 24.

Figure 12:
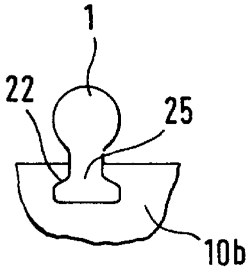
FIG. 12 is an enlarged view of a spacer in a carrier according to FIG. 11.
Figure 13:
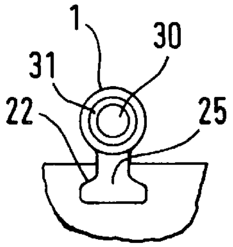
FIG. 13 is an enlarged view of a spacer according to another embodiment of the invention.

As shown in FIGS. 12 and 13, each spacer has a holder lug 25, which is cut back, and with which it engages a corresponding back-cut receptacle 22 of the carrier 10*b* and is held by the latter. The carrier 10*b* can then be made of plastic or another suitable material.

As shown in FIG. 13, the spacer 1 can have an approximately central weld projection 30 on its flat sides. Preferably, each weld projection 30 is surrounded by an annular groove 31.

Figure 14:
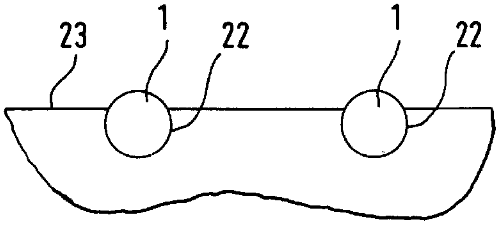
FIG. 14 is an enlarged view of the edge of a carrier according to FIG. 11.

As shown in FIG. 14, the spacers 1 can be configured as full discs which are held in receptacles 22 in the edge 23 of the carrier 10*b*. The receptacles 22 are configured to have a circular shape for holding the disc-shaped spacers 1 so that they cannot separate therefrom. The receptacles 22 are open over a component angle of less than 180°.

Figure 15:
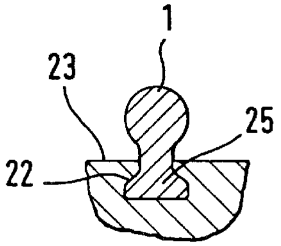
FIG. 15 is an enlarged view of a spacer.
Figure 16:
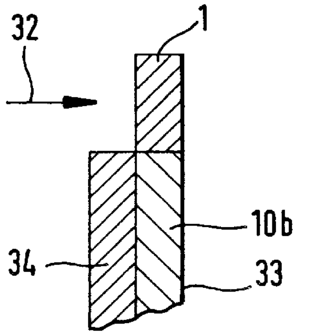
FIG. 16 is a schematic representation for punching a spacer into a carrier.

In the embodiment of FIGS. 15 and 16, the spacer 1 is configured with a holder lug 25 according to FIG. 12. As shown in FIG. 16, the spacer 1 is pressed with its holder lug 25 into a carrier plate 33 when punching the spacer 1 in the direction of arrow 32. The carrier plate 33 simultaneously defines the carrier 10*b* for use in assembling the guide bar 7. The carrier (10*a*, 10*b*) preferably comprises plastic. A metal foil can likewise be advantageous. The configuration from a non-conducting material can be advantageous for the welding operation.

Figure 17:
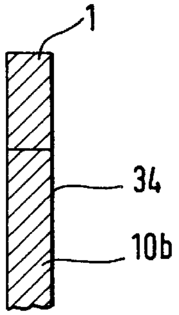
FIG. 17 is a section view taken through the spacer and a carrier made of the same material.
Figure 18:
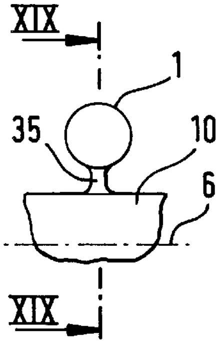
FIG. 18 a view of a spacer of another embodiment of the invention.
Figure 19:
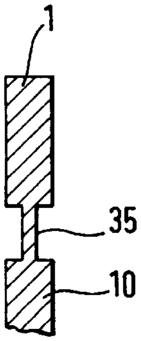
FIG. 19 is a section view taken along the line XIX—XIX of FIG. 18.
Figure 20:
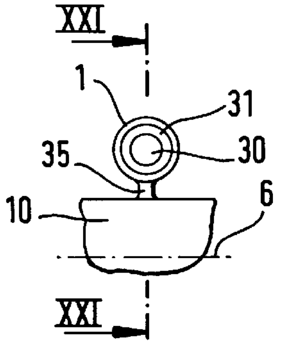
FIG. 20 is a view of a spacer of another embodiment of the invention.
Figure 21:
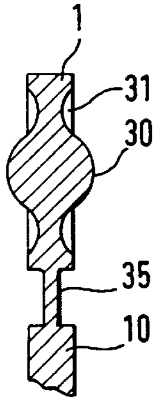
FIG. 21 is a section view along line XXI—XXI in FIG. 20.

FIG. 17 shows that the spacer 1 is first punched out of the base material 34 and is then pressed back into the unworked piece 34. The unworked piece 34 then defines the carrier 10*b* for use in assembling a guide bar 7.

In the embodiment of FIGS. 18 to 21, the carrier 10 together with the spacers 1 can be configured as a precision casting piece or forged piece. The spacers 1 are then connected via film hinges or thin material webs 35 to the carrier 10. With a forged piece, a central weld projection 30 and especially an annular groove 31 can be advantageously formed to improve the welding operation.

In the embodiment of FIG. 11, two carriers 10*a* and 10*b* are necessary. Each carrier (10*a*, 10*b*) holds the spacers 1 lying on one side of the longitudinal center axis 6 of the guide bar 7.

It is understood that the foregoing description is that of the preferred embodiments of the invention and that various changes and modifications may be made thereto without departing from the spirit and scope of the invention as defined in the appended claims.

What is claimed is:

1. A method for assembling a guide bar of a motor-driven chain saw, the guide bar having a periphery and a guide groove of a predetermined groove width along said periphery for accommodating the saw chain of the chain saw, the guide bar including first and second side parts and a plurality of spacers arranged between said side parts for holding said side parts at a spacing from each other corresponding to said groove width, the method comprising the steps of:

providing a common carrier holding said spacers so as to place said spacers at preassigned individual attachment points between said side parts;

joining said spacers and said side parts so that said spacers and said side parts are inseparably fixed to each other at said individual attachment points while said spacers are held by said common carrier; and, removing said common carrier after said spacers and said side parts are joined to each other.

2. The method of claim 1, wherein said spacers are positioned relative to said side parts at said attachment points by said common carrier.

3. The method of claim 2, comprising the further steps of:

providing alignment pins for aligning said side parts to each other; and, positioning said common carrier with said alignment pins.

4. The method of claim 3, comprising the further steps of:

providing respective openings in said side parts; and, removing said carrier through said openings after said side parts and said spacers are joined to each other.

5. The method of claim 4 wherein said carrier is removed by stamping.

6. The method of claim 5, wherein the edge of said openings is defined by a stamped edge.

* * * * *